United States Patent
Yu et al.

(10) Patent No.: US 11,385,405 B2
(45) Date of Patent: Jul. 12, 2022

(54) FIBER ARRAY FOR VERTICAL COUPLING

(71) Applicant: Wuhan Yilut Technology Co., Ltd., Wuhan (CN)

(72) Inventors: Chuang Yu, Wuhan (CN); Wanglong Huang, Wuhan (CN); Jingnong Cai, Wuhan (CN)

(73) Assignee: WUHAN YILUT TECHNOLOGY CO., LTD., Hubei (CN)

( * ) Notice: Subject to any disclaimer, the term of this patent is extended or adjusted under 35 U.S.C. 154(b) by 446 days.

(21) Appl. No.: 16/468,311

(22) PCT Filed: Apr. 28, 2018

(86) PCT No.: PCT/CN2018/085129
§ 371 (c)(1),
(2) Date: Jun. 11, 2019

(87) PCT Pub. No.: WO2019/200620
PCT Pub. Date: Oct. 24, 2019

(65) Prior Publication Data
US 2021/0333489 A1    Oct. 28, 2021

(30) Foreign Application Priority Data
Apr. 17, 2018 (CN) .......................... 201820555616.9

(51) Int. Cl.
*G02B 6/125* (2006.01)
*G02B 6/36* (2006.01)
(Continued)

(52) U.S. Cl.
CPC .............. *G02B 6/125* (2013.01); *G02B 6/40* (2013.01); *G02B 6/3636* (2013.01);
(Continued)

(58) Field of Classification Search
CPC .... G02B 6/125; G02B 6/3636; G02B 6/3664; G02B 6/3861; G02B 6/3885; G02B 6/40
See application file for complete search history.

(56) References Cited

U.S. PATENT DOCUMENTS 8,235,604 B2 * 8/2012 Suzuki ................. G02B 6/4249
385/88
8,705,916 B2 * 4/2014 Okuyama ............ G02B 6/4246
385/32
(Continued)

FOREIGN PATENT DOCUMENTS

CN           206741024 U  * 12/2017

*Primary Examiner* — Ryan A Lepisto
(74) *Attorney, Agent, or Firm* — Steptoe & Johnson LLP; Scott M. Richey

(57) ABSTRACT

The present application provides a fiber array for vertical coupling, including an optical fiber, an L-shaped plate, a U-shaped cover plate and a V-shaped slot; wherein the optical fiber includes a straight section, a curved transition section and a curved fixed section that are sequentially connected; the curved transition section of the optical fiber is arranged on an outer side surface of the L-shaped plate, the straight section of the optical fiber is fixedly arranged at a horizontal end of the L-shaped plate through the U-shaped cover plate, and the curved fixed section of the optical fiber is fixedly arranged on a curved end of the L-shaped plate through the V-shaped slot. The fiber array for vertical coupling provided by the present application can greatly reduce the optical loss in the light path.

7 Claims, 2 Drawing Sheets

(51) Int. Cl.
  *G02B 6/38*    (2006.01)
  *G02B 6/40*    (2006.01)
  *G02B 6/42*    (2006.01)

(52) U.S. Cl.
  CPC .......... *G02B 6/3664* (2013.01); *G02B 6/3829* (2013.01); *G02B 6/3861* (2013.01); *G02B 6/3885* (2013.01); *G02B 6/4249* (2013.01)

(56) References Cited

U.S. PATENT DOCUMENTS

| | | | | |
|---|---|---|---|---|
| D799,429 S | * | 10/2017 | Nakanishi | D13/147 |
| D799,430 S | * | 10/2017 | Nakanishi | D13/147 |
| D811,342 S | * | 2/2018 | Nakanishi | D13/147 |
| D821,330 S | * | 6/2018 | Nakanishi | D13/147 |
| 10,012,808 B2 | * | 7/2018 | Chou | H04B 10/25891 |
| 10,036,856 B2 | * | 7/2018 | Suematsu | G02B 6/3839 |
| 10,379,299 B2 | * | 8/2019 | Suematsu | G02B 6/24 |
| 10,539,746 B2 | * | 1/2020 | Nakanishi | G02B 6/03616 |
| 10,605,993 B2 | * | 3/2020 | Mitose | G02B 6/3616 |
| 10,739,536 B2 | * | 8/2020 | Matsushita | G02B 6/4202 |
| 10,807,330 B2 | * | 10/2020 | Matsushita | G02B 6/02395 |
| 2009/0297099 A1 | * | 12/2009 | Benjamin | G02B 6/4257 385/32 |
| 2010/0232743 A1 | * | 9/2010 | Ishikawa | G02B 6/3636 385/14 |
| 2016/0291261 A1 | * | 10/2016 | Izumi | G02B 6/421 |
| 2018/0292621 A1 | * | 10/2018 | Nanjo | G02B 6/426 |

\* cited by examiner

FIBER ARRAY FOR VERTICAL COUPLING

CROSS-REFERENCE

The present application claims priority to Chinese Patent Application No. 201820555616.9, filed on Apr. 17, 2018, entitled "Fiber Array for Vertical Coupling", the disclosure of which is incorporated herein by reference in its entirety.

FIELD OF TECHNOLOGY

The present application relates to the technical field of optical communication, and specifically to a fiber array for vertical coupling.

BACKGROUND

With the rapid development of communication technology and the rapid growth of its practical applications, the research of large-capacity optical fiber communication systems has great application value.

According to the broadband construction plan in the "13th Five-Year Plan" of the state (China), the optical communication industry will obviously benefit from the structural tilt of the capital expenditure of the operators, and the optical communication industry will have an explosive growth during the "13th Five-Year Plan" period.

Fiber arrays are widely used in optical splitters and other products. Corresponding optical splitters having different branching ratios such as 1:4, 1:8, 1:16, 1:32 etc. can be produced with optical splitter chips and fiber arrays of different channels. When the fiber-to-home marketing was launched in 2012, a small climax of passive devices was triggered. However, with the fall of the market, fiber array device manufacturers were once difficult to maintain business. However, since 2015, the demand for 40G and 100G optical devices has begun to grow, and fiber arrays have ushered in a new round of demand climax again.

Generally, a 4-core, 8-core, or 12-core optical fiber ribbon, along with a full-quartz substrate with a V-groove, is assembled into an important coupling component connecting the optical device and the optical fiber. Optical arrays for optical splitters generally require that the fiber array is flush with the end face of the fiber and horizontally coupled to the optical splitter device, which can be achieved by common grinding process. However, fiber arrays for 40G and 1000 active device products are mainly used for the coupling of the optical fiber with the laser, the detector, and etc., which is vertical coupling mostly, thereby raising new and higher requirements for the bending of optical fibers. The existing fiber arrays have been unable to meet the development requirements of the evolving active device products.

In summary, in the research and design process of the fiber array structure, it has important technical innovation value and significant practical application meaning to overcome the structural defects of the various existing fiber arrays, and to develop a fiber array that can be vertically coupled to various active devices well, and is small in size and simple in assembly.

SUMMARY

In view of the defects and deficiencies of the prior art, the present application provides a fiber array for vertical coupling.

The present application applies the following technical solutions:

A fiber array for vertical coupling includes an optical fiber, an L-shaped plate, a U-shaped cover plate and a V-shaped slot. The optical fiber includes a straight section, a curved transition section and a curved fixed section that are sequentially connected; the curved transition section of the optical fiber is arranged on an outer side surface of the L-shaped plate, the straight section of the optical fiber is fixedly arranged at a horizontal end of the L-shaped plate through the U-shaped cover plate, and the curved fixed section of the optical fiber is fixedly arranged on a curved end of the L-shaped plate through the V-shaped slot.

In the technical solution above, the optical fiber is G657.B3 optical fiber.

In the technical solutions above, a bending angle of the curved fixed section of the optical fiber is 97.5° to 98.5°.

Alternatively, in the technical solutions above, the optical fiber is a single-core optical fiber array or a multi-core optical fiber array.

In the technical solutions above, the curved fixed section of the optical fiber is bonded and fixed to the V-shaped slot and the curved end of the L-shaped plate with UV adhesive.

Alternatively, in the technical solutions above, the straight section of the optical fiber is bonded and fixed to the U-shaped cover plate and the horizontal end of the L-shaped plate with the UV adhesive; and a gap between the U-shaped cover plate and the horizontal end of the L-shaped plate is filled with the UV adhesive.

In the technical solutions above, a central step height of the U-shaped cover plate is 0.3-0.4 mm.

Alternatively, in the technical solutions above, an end portion of the curved fixed section of the optical fiber is flush with a lower end portion of the V-shaped slot and an end portion of the curved end of the L-shaped plate.

In the technical solutions above, the L-shaped plate, the U-shaped cover plate and the V-shaped slot are made of quartz glass materials.

The advantages of the present application at least include:

(1) the fiber array for vertical coupling provided by the present application can achieve a small-sized fiber array in which the optical transmission direction is bent by about 98°, which can effectively reduce the number of components in the light path, thereby greatly reducing the optical loss in the light path;

(2) The fiber array for vertical coupling provided by the present application is simple and reasonable in structure design, small in volume; and the packaging process is simple and easy to control, which effectively expands the coupling application of the fiber array with different active devices, and the effect is great. The fiber array for vertical coupling provided by the present application has important technical innovation value and significant meaning in practical application.

BRIEF DESCRIPTION OF THE DRAWINGS

In order to more clearly illustrate the technical solutions of the embodiments of the present application or the prior art, a brief description of the drawings to be used in the embodiments or the description of the prior art will be made hereinafter. Obviously, the drawings described below are some embodiments of the present application, and those of ordinary skill in the art can obtain other drawings according to these drawings without any creative work.

In the drawings.

Figure 1:
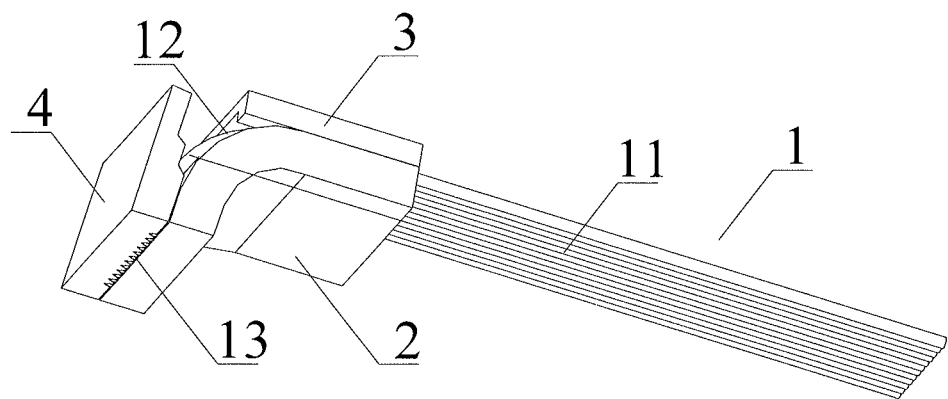
FIG. 1 is a stereogram of the fiber array for vertical coupling according to an embodiment of the present application.

optical fiber 1, straight section 11, curved transition section 12, curved fixed section 13, L-shaped plate 2, U-shaped cover plate 3, V-shaped slot 4.

DETAILED DESCRIPTION

In order to make the objects, technical solutions and advantages of the embodiments of the present application more clearly, the technical solutions in the embodiments of the present application will be clearly described hereinafter with reference to the drawings of the embodiments of the present application. Obviously, the embodiments described are a part but not all of the embodiments of the present application. Based on the embodiments of the present application, all other embodiments obtained by the person of ordinary skill in the art without creative work are within the protection scope of the present application.

In the description of the present application, it should be noted that unless specifically stated or defined otherwise, the terms "mount", "connect to", and "connect with" should be understood in a broad sense. For example, they may be fixed connections, removable connections, or integral connections; they may be mechanical connections or electrical connections; they may be direct connections or indirect connections through intermediate mediums, or may be internal connections of two components. For the person of ordinary skill in the art, the specific meanings in the present application of the terms above can be understood according to the specific situations.

As shown in FIG. 1, the embodiments of the present application provide a fiber array for vertical coupling, including an optical fiber 1, an L-shaped plate 2, a U-shaped cover plate 3 and a V-shaped slot 4.

Specifically, the optical fiber 1 includes a straight section 11, a curved transition section 12 and a curved fixed section 13 that are sequentially connected. The curved transition section 12 of the optical fiber 1 is arranged on an outer side surface of the L-shaped plate 2, the straight section 11 of the optical fiber 1 is fixedly arranged at a horizontal end of the L-shaped plate 2 through the U-shaped cover plate 3, and the curved fixed section 13 of the optical fiber 1 is fixedly arranged on a curved end of the L-shaped plate 2 through the V-shaped slot 4.

In a specific embodiment, the curved fixed section 13 of the optical fiber 1 is bonded and fixed to the V-shaped slot 4 and the curved end of the L-shaped plate 2 with UV adhesive.

In another specific embodiment, the straight section 11 of the optical fiber 1 is bonded and fixed to the U-shaped cover plate 3 and the horizontal end of the L-shaped plate 2 with UV adhesive. In addition, a gap between the U-shaped cover plate 3 and the horizontal end of the L-shaped plate 2 is filled with the UV adhesive.

Generally, the UV adhesive is ultraviolet curing epoxy resin.

Figure 2:
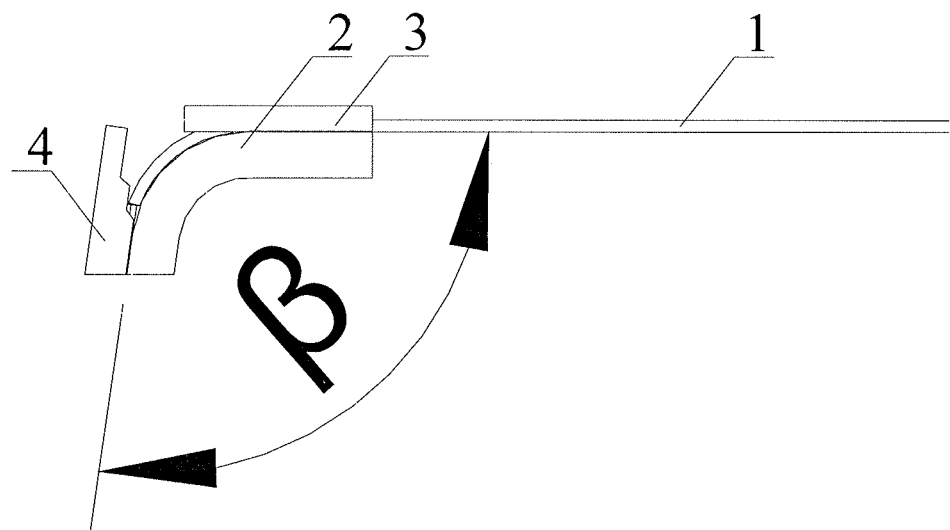
FIG. 2 is a front view of the fiber array for vertical coupling according to an embodiment of the present application.

Specifically, as shown in FIG. 2, a bending angle β of the curved fixed section 13 of the optical fiber 1 is 97.5° to 98.5°.

Specifically, the optical fiber 1 is a single-core optical fiber array or a twelve-core optical fiber array, such as G657.B3 type optical fiber.

Figure 3:
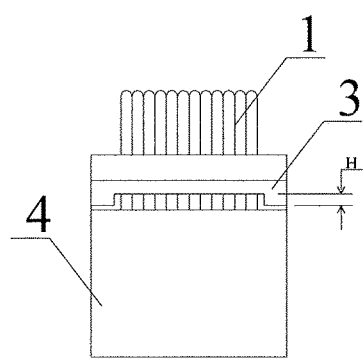
FIG. 3 is a left view of the fiber array for vertical coupling according to an embodiment of the present application.

Generally, as shown in FIG. 3, a central step height H of the U-shaped cover plate 3 is 0.3-0.4 mm.

In still another specific embodiment, an end portion of the curved fixed section 13 of the optical fiber 1, a lower end portion of the V-shaped slot 4 and an end portion of the curved end of the L-shaped plate 2 are boned into an integral structure which is then ground and polished, so that they are on a same plane.

Generally, the L-shaped plate 2, the U-shaped cover plate 3 and the V-shaped slot 4 are made of quartz glass materials.

Figure 4:
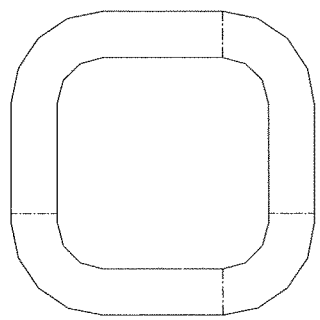
FIG. 4 is a cross-sectional structural diagram of the hollow cylindrical glass body raw material used in the L-shaped plate preparation according to an embodiment of the present application.

In addition, the preparation process of the fiber array for vertical coupling provided by the embodiments of the present application includes the following steps:

S1, L-shaped plate production: using a hollow cylindrical glass body with a cross-section as shown in FIG. 4 as a raw material, heating the raw material to 110±5° C., filling a hollow part of the glass body with paraffin wax; placing the glass body to room temperature and horizontally placing the central axis of the glass body; cutting the glass body into a plurality of cylindrical glass bodies having a set height with a high-precision cutting machine, then placing each of the cylindrical glass bodies with the central axis perpendicular to a horizontal line, and cutting along the dotted lines as shown in FIG. 4 with the high-precision cutting machine; after the cutting, heating each of the cylindrical glass bodies to 130° C., and soaking them with MARK 90 cleaning fluid and clean water for 30 min and 60 min respectively; removing the paraffin wax and the production of L-shaped plate being completed;

S2, U-shaped cover plate production: selecting a cutting blade with a corresponding width according to the width of the U-shaped groove, setting a cutting depth to be equal to the value of H, cutting out several stripped U-shaped grooves having a step depth H on a square glass piece, and cutting the square glass piece into U-shaped groove particles with the high-precision cutting machine according to the size of the U-shaped groove to obtain the U-shaped cover plate;

S3, assembly of the V-shaped slot, the optical fiber and the L-shaped plate: placing the optical fiber in the V-shaped slot after peeling off a coating layer from an end of the optical fiber; pressing against the ribbon optical fiber having the coated layer peeled off with a straight portion on a side of the L-shaped plate; filling the gap between the V-shaped slot and the L-shaped plate with UV adhesive, and then irradiating with a ultraviolet curing light source to cure;

S4, grinding and polishing the optical fiber assembled with the V-shaped slot and the L-shaped plate, detecting the appearance under a microscope, and proceeding to the next process after passing the detection;

S5, mounting of the U-shaped cover plate: after bending the optical fiber along the L-shaped plate, flattening the optical fiber and the L-shaped plate with the U-shaped cover plate so that the optical fiber is substantially adhered to the step of the U-shaped cover plate; injecting the same UV adhesive as used in S3 into the gap between the U-shaped cover plate and the L-shaped plate, and irradiating with the ultraviolet curing light source to cure;

S6, filling a UV adhesive in the curved section of the optical fiber, wherein the UV adhesive used here is connected with the UV adhesives in S3 and S5 to ensure that the portion where the optical fiber is adhered to the L-shaped plate is fully covered by the UV adhesive; and the UV adhesive used here has a hardness lower than that of the UV adhesives in S3 and S5 to ensure higher reliability of the product, and finally irradiating with the ultraviolet curing light source for curing so as to obtain the fiber array.

The fiber array for vertical coupling provided by the embodiments of the present application can achieve a small-sized fiber array in which the optical transmission direction is bent by about 98°, which can effectively reduce the number of components in the light path, thereby greatly reducing the optical loss in the light path. The structure design is simple and reasonable, the volume is small, the packaging process is simple, and the process is easy to control, which effectively expands the coupling application of the fiber array with different active devices, and the effect is great. The fiber array for vertical coupling provided by the embodiments of the present application has important technical innovation value and significant meaning in practical application.

Finally, it should be noted that the embodiments above are only used to illustrate rather than to limit the technical solutions of the present application. Although the present application has been described in detail with reference to the foregoing embodiments, those of ordinary skill in the art should understand that they can still modify the technical solutions described in the foregoing embodiments, or equivalently replace some of the technical features therein; and these modifications or replacements do not depart the essence of the corresponding technical solutions from the spirit and scope of the technical solutions of the various embodiments of the present application.

INDUSTRIAL APPLICABILITY

The fiber array for vertical coupling provided by the present application can achieve a small-sized fiber array in which the optical transmission direction is bent by about 98°, which can effectively reduce the number of components in the light path, thereby greatly reducing the optical loss in the light path. The structure design is simple and reasonable, the volume is small, the packaging process is simple and easy to control, which effectively expands the coupling application of the fiber array with different active devices, and the effect is great. The fiber array for vertical coupling provided by the embodiments of the present application has important technical innovation value and significant meaning in practical application.

What is claimed is:

1. A fiber array for vertical coupling, comprising:
an optical fiber, an L-shaped plate, a U-shaped cover plate and a V-shaped slot;
wherein the optical fiber comprises a straight section, a curved transition section and a curved fixed section that are sequentially connected;
the curved transition section of the optical fiber is arranged on an outer side surface of the L-shaped plate, the straight section of the optical fiber is fixedly arranged at a horizontal end of the L-shaped plate through the U-shaped cover plate, and the curved fixed section of the optical fiber is fixedly arranged on a curved end of the L-shaped plate through the V-shaped slot;
the straight section of the optical fiber is bonded and fixed to the U-shaped cover plate and the horizontal end of the L-shaped plate with a first UV adhesive having a first hardness;
a gap between the U-shaped cover plate and the horizontal end of the L-shaped plate is filled with the first UV adhesive;
the curved fixed section of the optical fiber is bonded and fixed to the V-shaped slot and the curved end of the L-shaped plate with a second UV adhesive having a second hardness; and
wherein the first hardness is higher than the second hardness.

2. The fiber array for vertical coupling of claim 1, wherein the optical fiber is G657.B3 optical fiber.

3. The fiber array for vertical coupling of claim 1, wherein a bending angle of the curved fixed section of the optical fiber is 97.5° to 98.5°.

4. The fiber array for vertical coupling of claim 1, wherein the optical fiber is a single-core optical fiber array or a multi-core optical fiber array.

5. The fiber array for vertical coupling of claim 1, wherein a central step height of the U-shaped cover plate is 0.3-0.4 mm.

6. The fiber array for vertical coupling of claim 1, wherein an end portion of the curved fixed section of the optical fiber is flush with a lower end portion of the V-shaped slot and an end portion of the curved end of the L-shaped plate.

7. The fiber array for vertical coupling of claim 1, wherein the L-shaped plate, the U-shaped cover plate and the V-shaped slot are made of quartz glass materials.

* * * * *